United States Patent
Rotker et al.

(10) Patent No.: US 9,170,869 B2
(45) Date of Patent: Oct. 27, 2015

(54) SWITCHABLE PER-LANE BIT ERROR COUNT

(71) Applicant: Oracle International Corporation, Redwood City, CA (US)

(72) Inventors: Paul Rotker, Harvard, MA (US); Bikram Saha, Cupertino, CA (US); Jason Miller, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 317 days.

(21) Appl. No.: 13/671,311

(22) Filed: Nov. 7, 2012

(65) Prior Publication Data

US 2014/0129909 A1 May 8, 2014

(51) Int. Cl.
*G06F 11/00* (2006.01)
*G06F 11/07* (2006.01)
*G06F 11/10* (2006.01)
*H04L 1/00* (2006.01)

(52) U.S. Cl.
CPC ........ *G06F 11/0745* (2013.01); *G06F 11/0763* (2013.01); *G06F 11/10* (2013.01); *G06F 11/1008* (2013.01); *G06F 11/1076* (2013.01); *H04L 1/0045* (2013.01); *H04L 1/0061* (2013.01)

(58) Field of Classification Search
CPC . G06F 11/10; G06F 11/1008; G06F 11/1076; H04L 1/0061; H04L 1/0045
USPC .......................................... 714/799, 807, 819
See application file for complete search history.

(56) References Cited

U.S. PATENT DOCUMENTS

| | | | |
|---|---|---|---|
| 5,457,702 A | 10/1995 | Williams, III et al. | |
| 5,566,193 A | 10/1996 | Cloonan | |
| 5,568,526 A * | 10/1996 | Ferraiolo et al. | 375/356 |
| 7,221,650 B1 * | 5/2007 | Cooper et al. | 370/236 |
| 7,272,773 B2 | 9/2007 | Cargnoni et al. | |
| 7,286,572 B2 * | 10/2007 | Hornbuckle et al. | 370/537 |
| 7,613,958 B2 * | 11/2009 | Lesartre et al. | 714/701 |
| 7,802,167 B1 | 9/2010 | Gorshe | |
| 8,090,976 B2 | 1/2012 | Maciver et al. | |
| 2006/0092969 A1 * | 5/2006 | Susnow et al. | 370/465 |
| 2009/0006928 A1 | 1/2009 | Chou et al. | |
| 2009/0224809 A1 * | 9/2009 | Matsumoto et al. | 327/141 |
| 2010/0185919 A1 * | 7/2010 | Lawson et al. | 714/758 |
| 2011/0004793 A1 * | 1/2011 | Sul et al. | 714/718 |
| 2011/0292932 A1 * | 12/2011 | Nichols et al. | 370/376 |
| 2011/0320885 A1 * | 12/2011 | Owaki et al. | 714/48 |

OTHER PUBLICATIONS

Abstract for a Mandelbaum, "Arithmetic Error Detecting Codes for Communications Links Involving Computers," IEEE Transactions on Communication Systems Inc., vol. 13, Issue 2, Jun. 1965, 1 page.
Abstract for O.O Khalifa, "Cyclic redundancy encoder for error detection in communication channels," RF and Microwave Conference, Oct. 5-6, 2004, 1 page.
Abstract for Duc-Minh Pham, "Error Detection and Correction in Communication Channels Using Inverse Gray RSNS Codes," IEEE Transactions on Communications, vol. 59, Issue 4, Apr. 2011, 1 page.

* cited by examiner

*Primary Examiner* — Albert Decady
*Assistant Examiner* — Osman Alshack
(74) *Attorney, Agent, or Firm* — Meyertons, Hood, Kivlin, Kowert & Goetzel, P.C.

(57) ABSTRACT

Systems, methods, and apparatuses for error checking are disclosed. In one embodiment, an error checking system is used on a device that has a plurality of parallel data lanes as inputs. It may be desired to provide an error checking system with sufficient resolution to detect single-bit errors, determine how many bits are in error, and/or determine which bit(s) of a parallel data lane are in error. In one embodiment, the present disclosure provides for switchable error checking through the use of a multiplexor configured to select a particular data lane for error checking. This switchable error checking may provide benefits such as low cost, low power consumption, and/or low size.

12 Claims, 8 Drawing Sheets

SWITCHABLE PER-LANE BIT ERROR COUNT

BACKGROUND

1. Technical Field

This disclosure relates generally to the detection of errors in data transmission in integrated circuits and other devices.

2. Description of the Related Art

Various types of integrated circuits and other devices may be coupled to computer buses, including processing elements, memory controllers, peripherals, etc. Such devices may pass information including address, data, and control to one another over these buses. From time to time, information being transmitted on a computer system bus may be corrupted, resulting in transmission errors. Such errors may occur in a variety of manners—for example, during writing, reading, storage, transmission, or processing of data. Data that is "silently" corrupted—that is, without being detected by the computer system—may cause catastrophic failures.

Accordingly, various techniques for detecting such errors have been used and are known in the art. In some embodiments, however, the known techniques may require an excessive amount of error checking circuitry or may be unable to determine the location and nature of errors with specificity.

SUMMARY

The present disclosure provides methods, systems, and apparatuses for error checking that address deficiencies of the known art. In various embodiments, the present disclosure provides for switchable error detection, which can detect errors on selected data transmission lanes. This may provide high error-detection resolution with a relatively small amount of hardware.

In one embodiment, an apparatus is disclosed that includes a deserializer unit configured to receive input data on a plurality of serial data lines and transmit the input data corresponding to a given one of the plurality of serial data lines in parallel on a corresponding one of a plurality of output data lanes. The apparatus further includes a selection circuit configured to select one of the plurality of output data lanes for error checking and an error checking unit configured to receive data corresponding to the selected one of the plurality of output data lanes and compare the received data to an expected data pattern.

According to another embodiment, a method is disclosed including reading a storage location to determine a value indicative of a selected one of a plurality of data lanes to check for data errors. The method further includes, responsive to the determined value, routing output from the selected data lane to an error checking circuit, which compares the routed output to an expected data pattern to determine if an error is present.

According to a third embodiment, a system is disclosed which includes a first device configured to transmit a first set of data via a first plurality of transmission lines and a second device configured to receive a second set of data corresponding to the first set of data via a second plurality of transmission lines. The second device includes a transmission line selector configured to select a particular subset of the second plurality of transmission lines for error detection, as well as an error detection circuit configured to compare the second set of data received via the particular subset of the second plurality of transmission lines to known data corresponding to the first set of data.

DETAILED DESCRIPTION

Figure 1A:
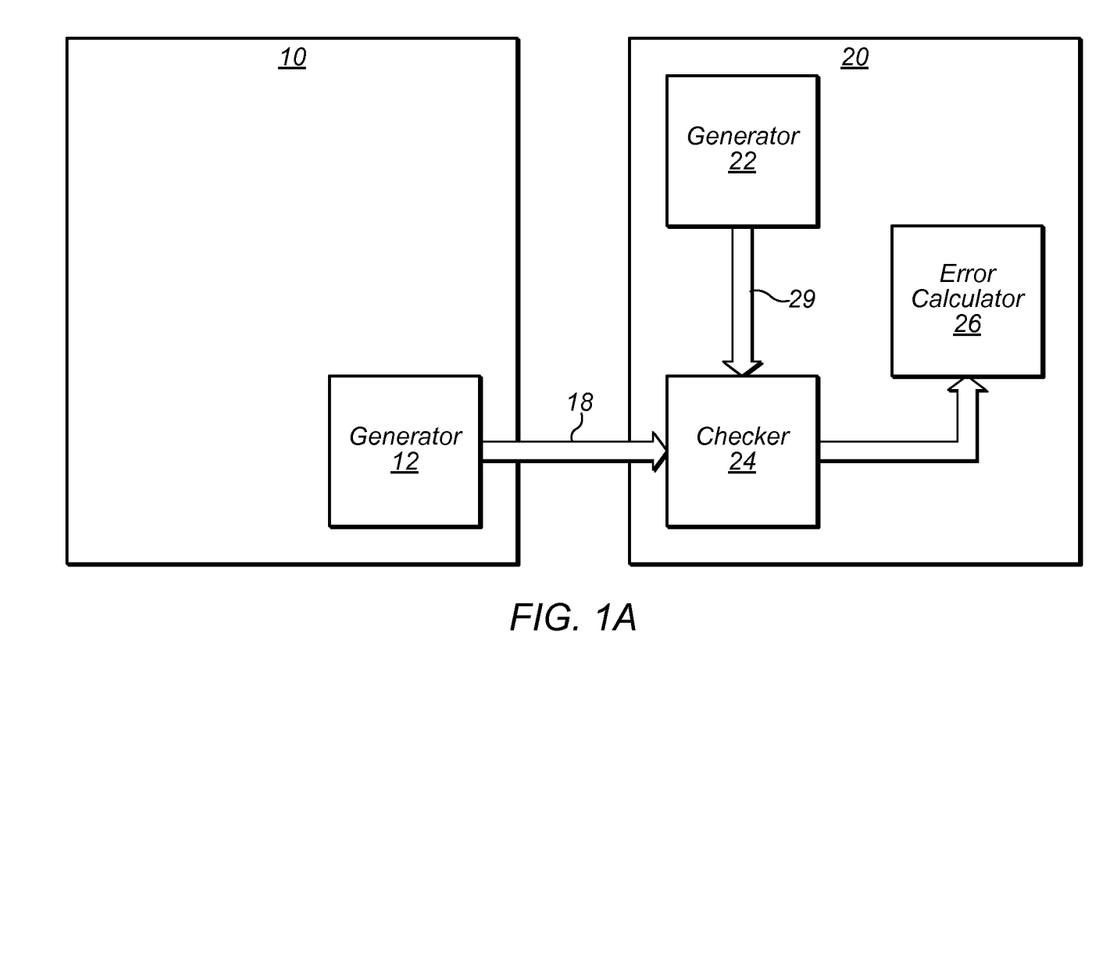
FIG. 1A is a block diagram for transmissions between two integrated circuits with error checking.

Turning now to FIG. 1A, a high-level block diagram of one embodiment of the present disclosure is shown. FIG. 1A includes devices 10 and 20 to illustrate some of the principles of this disclosure. Device 10 includes generator 12, and device 20 includes checker 24.

Devices 10 and 20 may broadly represent any circuits, units, or other structures that need to communicate information to one another data. For example, they may be separate integrated circuits (ICs) on the same or different boards, circuits within a single IC, separate devices, circuits within different devices, etc.

Device 10 includes generator 12 configured to produce a data stream to be sent to device 20. For example, in one embodiment device 10 and device 20 may both correspond to memory interface or memory buffer chips. In another embodiment, they may correspond to a microprocessor and a bridge device that links device 10 to another bus, network, etc.

In some embodiments, bus 18 is configured to transfer a data stream to checker 24, a component of device 20. Bus 18 can represent any suitable physical connection or connections between devices 10 and 20. The term "bus" generally refers to a physical connection or set of physical connections that are shared among two or more structures (e.g., devices 10 and 20) to communicate information. In one embodiment, for example, bus 18 might include 16 or 32 physical connections shared between devices 10 and 20 to communicate data, addresses, and/or other information. In some embodiments, bus 18 includes a plurality of physical signal lines or wires, such as those located on a printed circuit board or other medium. Such physical signal lines or wires may themselves be serial or parallel transmission lines in some embodiments. Generally for purposes of this disclosure, an individual or serial data connection will be referred to as a "line." A parallel data connection will be referred to a "lane." One of ordinary skill in the art will recognize that these terms may refer to any suitable type of data connection. Some non-limiting examples of such data connections may include wires, PCB traces, conductors within an integrated circuit, optoelectronic connections, and any other connection operable to transfer data. In some embodiments, a lane may comprise a plurality of lines.

Checker 24 is in one embodiment configured to compare the data received on bus 18 to expected data generated by generator 22. The expected data may be transferred to checker 24 via bus 29. The data generated by generator 22 corresponds to the data generated by generator 12. For example, it may in some embodiments be the same data. In other embodiments, it may be data that is decodable in some way to become the data generated by generator 12. In some embodiments, whenever there is a mismatch between the expected data and the data received via bus 18, checker 24 may be configured to communicate to error calculator 26 that an error has occurred. Error calculator 26 may be configured in any suitable manner according to known teachings in the art. In some embodiments, error calculator 26 is a simple accumulator that keeps track of the count of errors reported by checker 24.

In some embodiments, devices 10 and 20 may be symmetric. What is meant by the two devices being "symmetric" in this disclosure is that, in the same way that device 20 is configured to perform error checking on data received from device 10, device 10 may also be configured to perform error checking on data received from device 20.

Figure 1B:
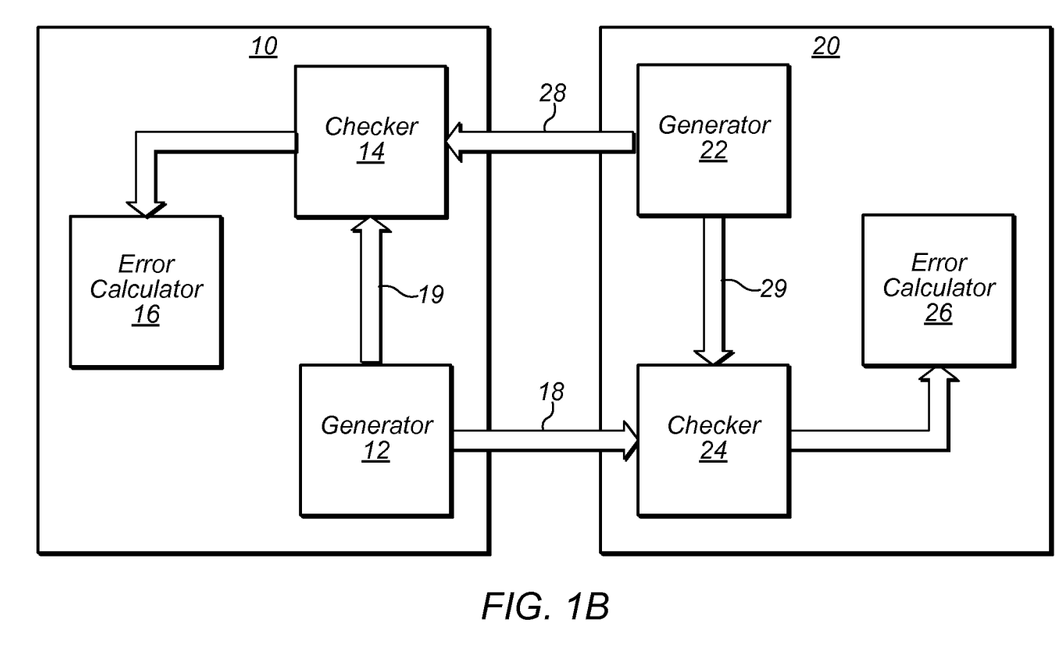
FIG. 1B is a block diagram for transmissions between two symmetric integrated circuits with error checking.

Turning now to FIG. 1B, a symmetric embodiment of FIG. 1A is shown. In this embodiment, device 10 is configured to perform the same type of error checking that device 20 is configured to perform in FIG. 1A, with similar reference numerals denoting similar components. Such error checking may be carried out concurrently or at different times, compared to the error checking carried out at device 20.

Figure 2:
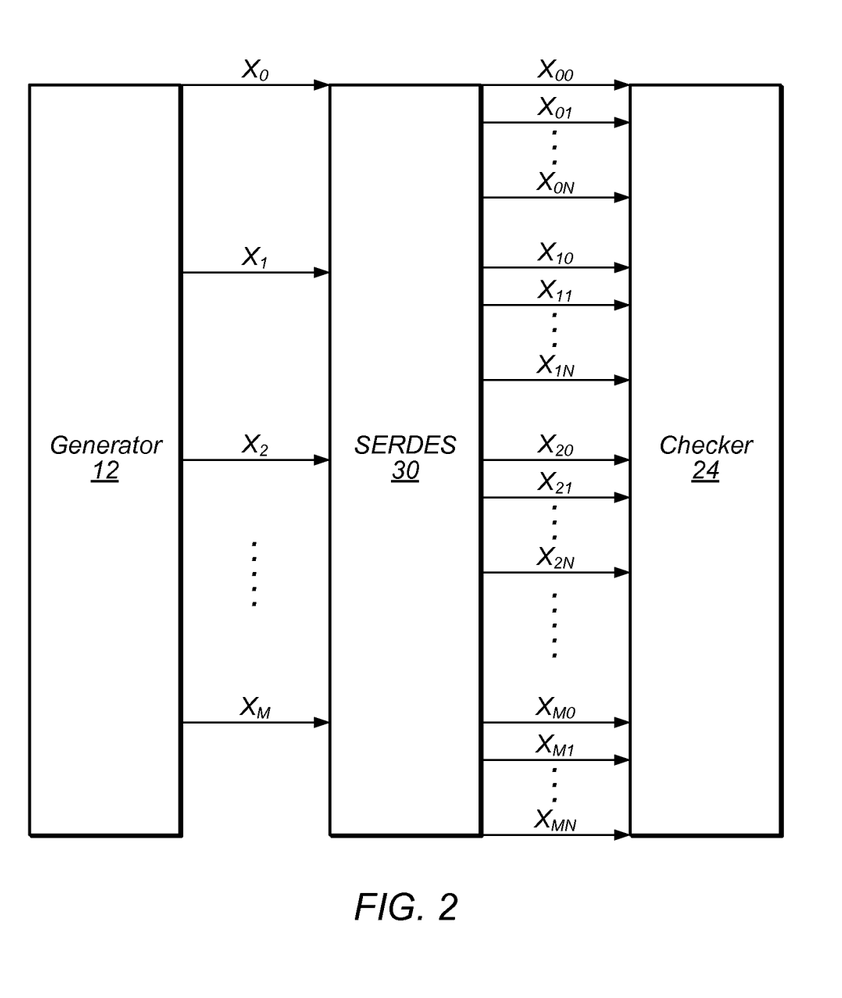
FIG. 2 is a detailed block diagram of the transmission lines of FIG. 1A.

Turning now to FIG. 2, a detailed view of one embodiment of bus 18 connecting generator 12 to checker 24 is shown. In the embodiment shown in FIG. 2, bus 18 includes a deserializer, shown as SERDES (serializer/deserializer) 30. As shown, generator 12 is coupled to SERDES 30 via a plurality of transmission lines $X_0, X_1, X_2, \ldots, X_M$. Transmission lines $X_0, X_1, X_2, \ldots, X_M$ are shown as a plurality of high-speed serial data lines. Transmission lines $X_0, X_1, X_2, \ldots, X_M$ may in some embodiments be differential data lines, each including both a positive and a negative conductor.

In some embodiments, SERDES 30 includes circuitry configured to transform incoming transmission lines into a parallelized output including a number of individual, lower-speed lines. For example, $X_0$ is transformed into $X_{00}$, $X_{01}, \ldots, X_{0N}$. Each of $X_1$ through $X_M$ is transformed into a corresponding set of outputs.

Because the inputs and outputs are shown as zero-indexed in this embodiment, each input is transformed into (N+1) outputs. Thus SERDES 30 is shown as being configured to take M+1 inputs and produce (M+1)*(N+1) outputs. The clock speed of the outputs may typically be reduced in proportion to the number of outputs into which each input is transformed. As a non-limiting example, if $X_0, X_1, X_2, \ldots, X_M$ each have a speed of 10 Gb/second, then each of $X_{00}, X_{01}, \ldots, X_{0N}$; $X_{10}, X_{11}, X_{1N}$; $X_{20}, X_{21}, \ldots, X_{2N}$; and $X_{M0}, X_{M1}, \ldots, X_{MN}$ would typically have a speed of 10/(N+1) Gb/second. Checker 24 is thus shown as being configured to take as its inputs M+1 parallel data lanes, with each data lane having N+1 individual transmission lines.

Many types of deserializers are known in the art; SERDES 30 is representative of any suitable such deserializer configured to make the described transformations.

Figure 3:
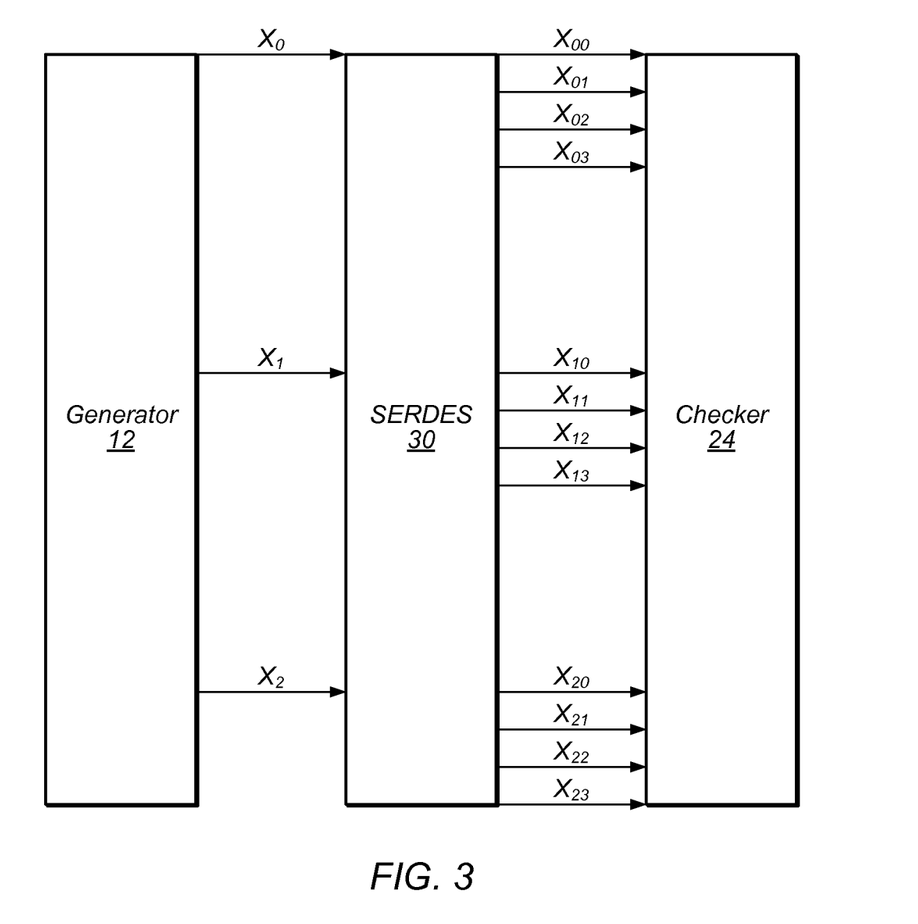
FIG. 3 is a simplified detail block diagram of the transmission lines of FIG. 1A.

Turning now to FIG. 3, a block diagram similar to that of FIG. 2 is shown. In this embodiment, fixed values for M and N are shown. The scope of the present disclosure is of course not to be limited to such fixed values, but for the sake of simplicity, clarity, and concreteness, portions of this disclosure will discuss the case where M=2 and N=3. Thus SERDES 30, as shown in FIG. 3, is configured to take 3 (i.e., M+1) high-speed serial inputs and transform each into a parallel output containing 4 (i.e., N+1) lower-speed individual transmission lines, for a total of 12 lines (i.e., (M+1)*(N+1)).

Figure 4:
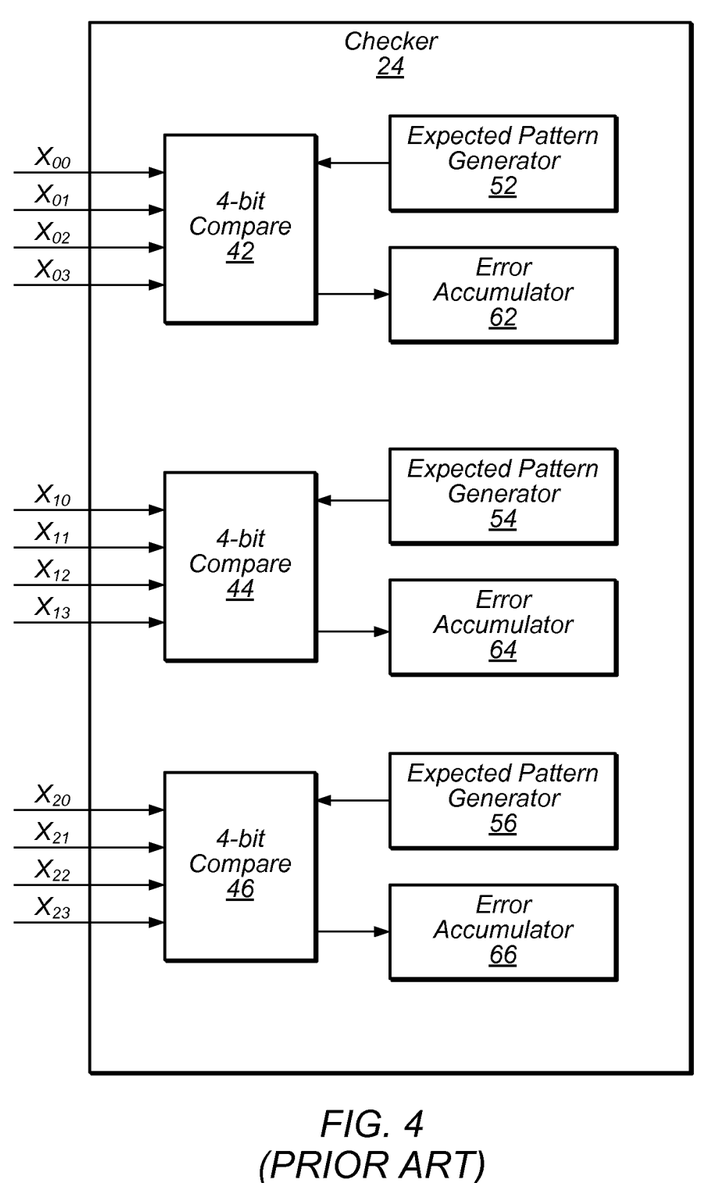
FIG. 4 is a detail block diagram of a prior art error checking circuit.

Turning now to FIG. 4, and continuing with the scenario in which M=2 and N=3, a detailed block diagram of a prior-art version of checker 24 is shown. Three separate 4-bit compare devices are included. Input lines $X_{00}, X_{01}, X_{02},$ and $X_{03}$ are shown as inputs to 4-bit compare device 42. In this embodiment, 4-bit compare device 42 is also configured to accept an expected pattern from expected pattern generator 52, with the expected pattern corresponding to the data that would be received on input lines $X_{00}, X_{01}, X_{02},$ and $X_{03}$ in the absence of any transmission errors. At each clock cycle in this embodiment, a set of four bits is received and compared to the expected pattern. If there is any difference, error accumulator 62 is configured to increase its error count by one.

Similarly, corresponding input lines are connected to 4-bit compare devices 44 and 46, and error accumulators 64 and 66 are configured to accumulate error counts based on expected pattern generators 54 and 56 in this embodiment.

One downside to the approach shown in FIG. 4 is that there is no way to distinguish between, for example, a 1-bit error and a multiple-bit error. Another downside is that there is no way of knowing which one of input lines $X_{00}, X_{01}, X_{02},$ and $X_{03}$ produced the error. The only information that 4-bit compare devices 42, 44, and 46 can determine is that there was at least one error during a particular clock cycle. Such errors may be referred to as "symbol errors," and they are the limit of detection for the system shown in FIG. 4. FIG. 4 thus illustrates a system having an error detection resolution of four bits.

Accordingly, if a particular one of input lines $X_{00}, X_{01}, X_{02},$ and $X_{03}$ is more prone to errors than the others, there is no way for the system shown in FIG. 4 to determine that this is the case, or to determine which input line is faulty. In order to remedy these deficiencies, the system of FIG. 4 might include separate 1-bit compare devices for each of the 12 (i.e., (M+1)*(N+1)) input lines. For large values of M and/or N, however, such an approach may be unduly costly, may use an undue amount of device area, and/or may use an undue amount of power.

Figure 5:
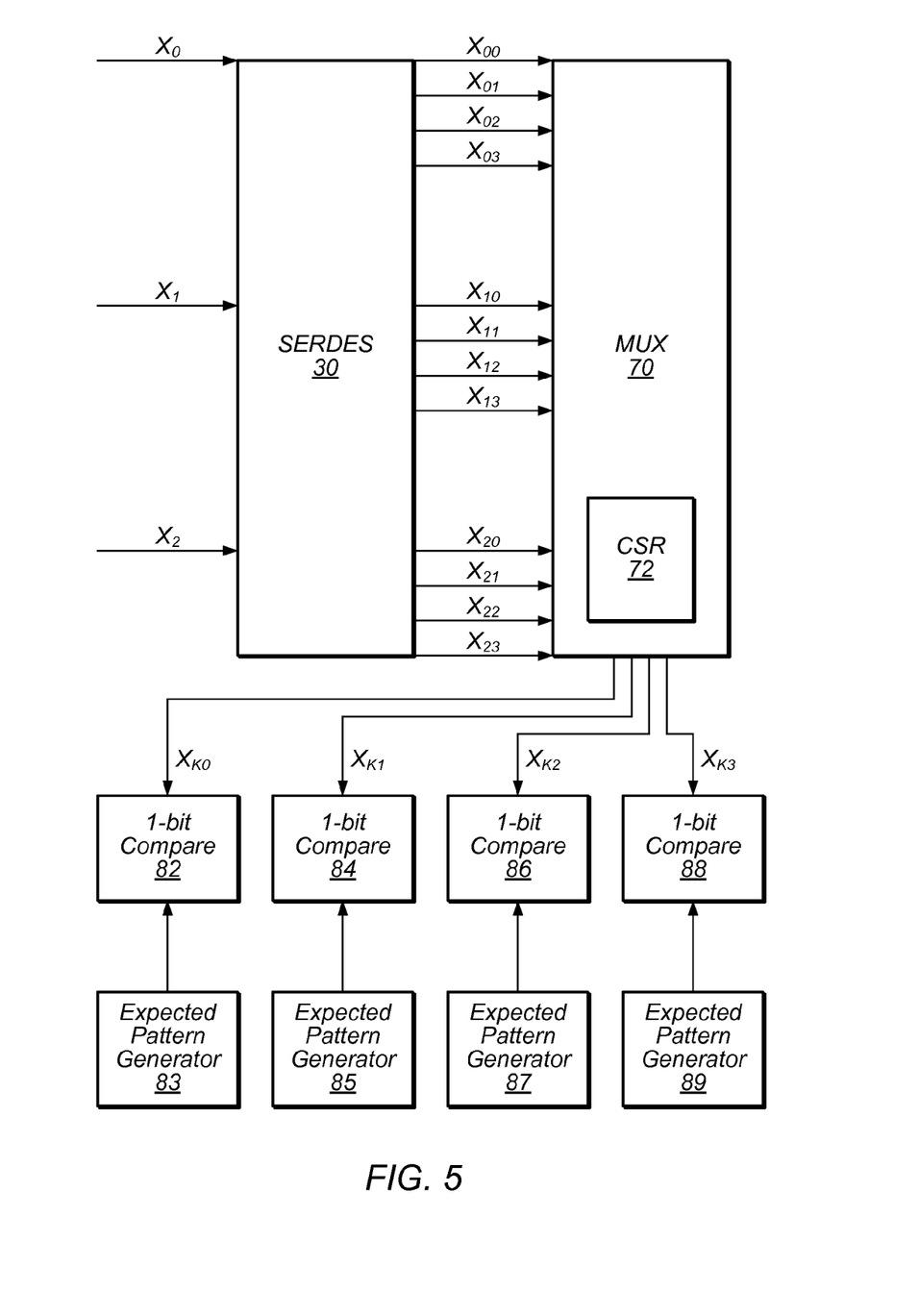
FIG. 5 is a detail block diagram of an error checking circuit according to the present disclosure.

Turning now to FIG. 5, one embodiment of an error checking device according to the present disclosure is shown. This embodiment may address at least some of the deficiencies noted above with reference to FIG. 4. Rather than being connected directly to checker 24, the outputs from SERDES 30 are instead connected to MUX 70, a 3-to-1 (i.e., an (M+1)-to-1) multiplexer.

In the embodiment shown, MUX 70 includes a control and status register shown as CSR 72. CSR 72 may be set to determine which set of parallel inputs to MUX 70 is selected for error checking CSR 72 may also be located elsewhere within the device. If CSR 72 is set to a value corresponding to "K," for example, then MUX 70 would be configured in this embodiment to route the input lines $X_{K0}, X_{K1}, X_{K2},$ and $X_{K3}$ to the error checking circuitry.

The error checking circuitry shown in FIG. 5 includes each of $X_{K0}, X_{K1}, X_{K2},$ and $X_{K3}$ being routed to a particular 1-bit compare device, shown at 82, 84, 86, and 88. Each of 1-bit compare devices 82, 84, 86, and 88 are also configured to accept expected patterns from corresponding expected pattern generators 83, 85, 87, and 89, with the expected patterns provided corresponding to the data that would be received on input lines $X_{K0}, X_{K1}, X_{K2},$ and $X_{K3}$ in the absence of errors. At each clock cycle in this embodiment, one bit is received at each 1-bit compare device and compared to the expected bit; if there is any difference, an error accumulator (not shown) may be configured to increase its error count by one. The error accumulator may also be implemented as four separate error accumulators, one coupled to each 1-bit compare device 82, 84, 86, and 88. Expected pattern generators 83, 85, 87, and 89 are shown in FIG. 5 as separate components, but one of ordinary skill in the art will understand that they could be implemented as a single device.

One of ordinary skill in the art will also appreciate that while FIG. 5 shows four separate 1-bit comparators, the same functionality could be accomplished with a single comparator having four inputs, the single comparator configured to detect single bit errors on each of the four inputs.

According to the embodiment shown in FIG. 5, whenever an error on a particular one of input lines $X_{K0}$, $X_{K1}$, $X_{K2}$, and $X_{K3}$ occurs, the error accumulator (not shown) may be configured to record which input line was the source of the error. This is in contrast to the system shown in FIG. 4, which is unable to determine which input line is the source of a symbol error. The system of FIG. 5 thus has an error detection resolution of one bit.

Further, the embodiment shown in FIG. 5 allows for the ability to distinguish among one-bit errors, two-bit errors, three-bit errors, and four-bit errors. The detailed error logging provided by the present disclosure may be useful, for example, in troubleshooting devices and obtaining burst error signatures. The configuration of FIG. 5 allows for an error-detection resolution that is increased by a factor of 4 (or in the general case, a factor of N+1).

By enabling switching between the three sets of four-bit inputs, MUX 70 in this embodiment allows detection of single-bit errors on all twelve input lines, while requiring only four 1-bit compare devices. Without the use of MUX 70, such high-resolution detection of errors would require twelve 1-bit compare devices. In the general case, the present disclosure may in some embodiments reduce the number of 1-bit compare devices required from (M+1)*(N+1) down to N+1. These N+1 devices may then be switched among the M+1 inputs as desired for error checking purposes. In real-world devices, M may be quite large, for example 12 or more. Accordingly, the present disclosure may in some embodiments provide for an order-of magnitude (or even larger) reduction in the number of 1-bit compare devices.

Figure 6:
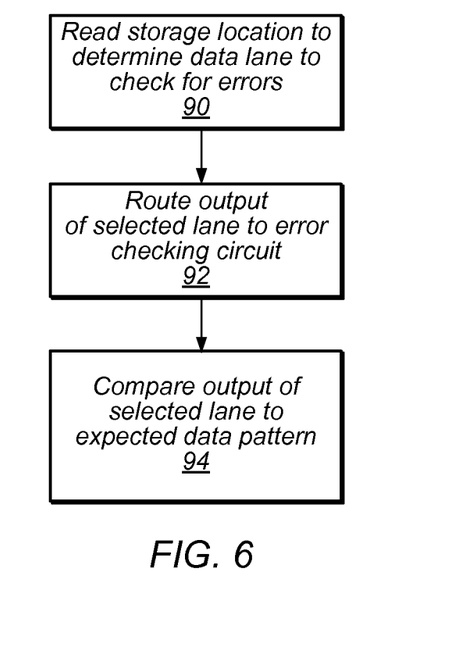
FIGS. 6-8 are process flows for error checking according to the present disclosure.
Figure 7:
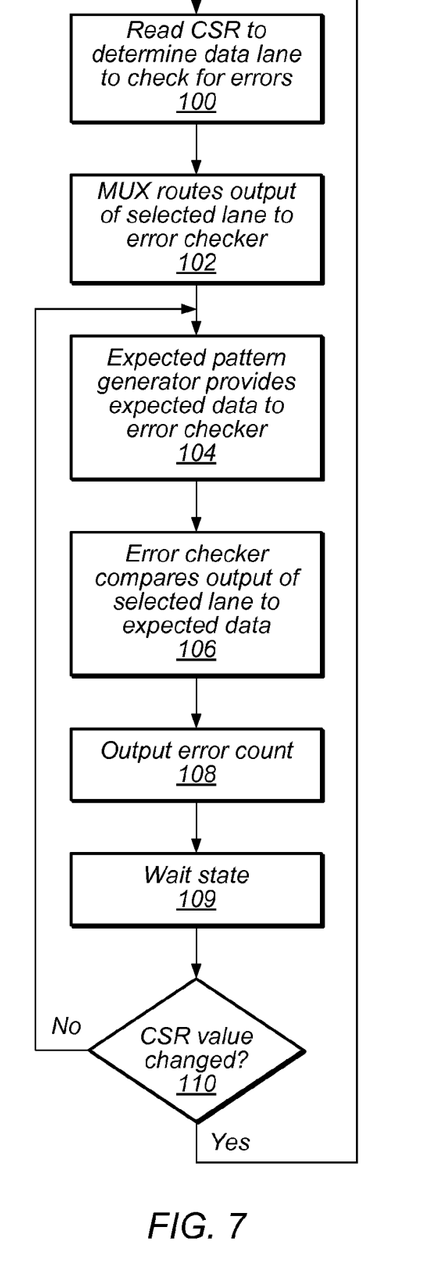
Figure 8:
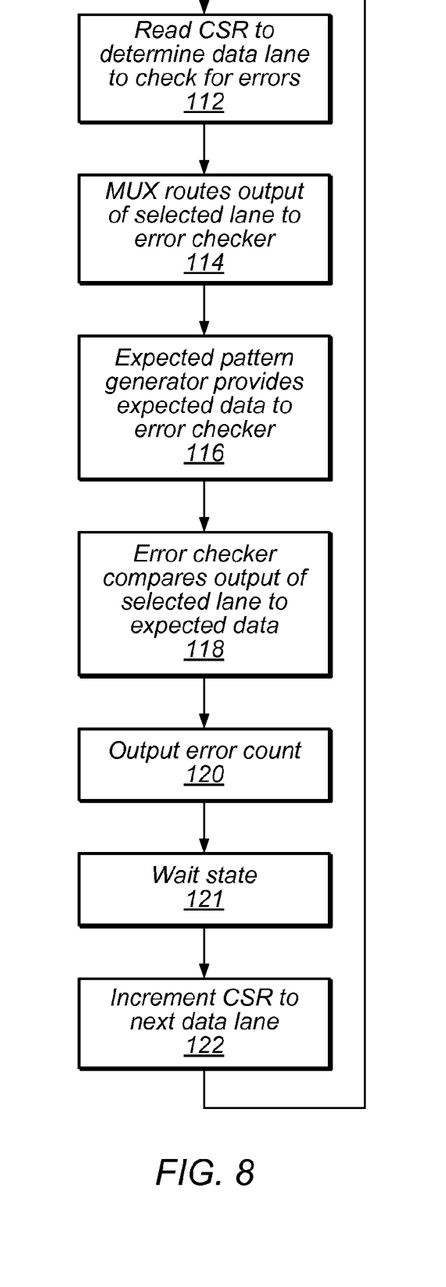

FIGS. 6-8 provide exemplary process flows of some embodiments of the present disclosure. One of ordinary skill in the art will recognize that various modifications may be made to the specific processes shown in these figures without departing from the present disclosure.

Turning now to FIG. 6, an exemplary process flow for using the teachings of the present disclosure to provide switchable error checking is shown. At step 90, a storage location is read to determine which data lane is to be checked for errors.

At step 92, based on the value read from the storage location, the output of the selected lane is routed to an error checking circuit. The error checking circuit then compares the output of the selected lane to an expected data pattern at step 94. The expected data pattern may be provided to the error checking circuit in various ways, some of which have been described in detail previously.

Turning now to FIG. 7, another exemplary process flow according to the present disclosure is shown. The embodiment shown in FIG. 7 uses a MUX and a CSR to implement portions of the disclosed process.

At step 100, the CSR corresponding to the MUX is read to determine which data lane is to be checked for errors. The data lane may be a parallel data lane with a plurality of individual transmission lines, or it may be a single serial data lane in various embodiments. The CSR may be set by any suitable method. An operator might set the CSR to a particular value to manually check a particular data lane for errors, or the CSR might be set programmatically by debugging software as part of a testing routine, for example.

At step 102 based on the value of the CSR, the MUX routes the output of the selected data lane to the error checking circuitry. This may be accomplished in any of a variety of known ways.

At step 104, the error checking circuitry receives expected data from one or more expected pattern generators. This data corresponds to the data that would be received from the MUX in the absence of any errors. Thus by comparing the data received from the MUX against the expected data at step 106, the error checking circuitry may determine whether any transmission errors have occurred.

If any errors have occurred, the error checking circuitry outputs data corresponding to those errors (e.g., an error count) at step 108 in this embodiment. Wait state 109 in this embodiment allows sufficient time for the error count output at step 108 to be completed.

As long as the value of the CSR remains unchanged at step 110, the method loops through steps 104, 106, 108, and 109 in this embodiment. This allows extended periods of error checking on a particular data lane if desired.

When the system determines that the CSR value has changed, the method returns to step 100 and repeats itself on a new data lane. In this way, whatever data lanes require error checking can be checked in turn.

In some embodiments, the system may be configured such that all data lanes are checked according to a specified sequence. One such embodiment is shown in FIG. 8. The process flow of FIG. 8 is generally similar to the process flow of FIG. 7, with steps 100, 102, 104, 106, 108, and 109 corresponding to steps 112, 114, 116, 118, 120, and 121 respectively.

One difference in the embodiment of FIG. 8 is that after the error count is output in step 120, the system automatically increments the value of the CSR to a value corresponding to the next data lane to be checked for errors. In this way, the system can perform error checking on each data lane (e.g., for a determined amount of time), and then check the next lane. The method may be configured to check each lane only once, or it may be configured to loop through the set of data lanes repeatedly until interrupted in various embodiments.

The disclosed subject matter thus provides high-resolution error detection at relatively low power, cost, and device size. This improves on various aspects of known error detection, such as the typical requirement for undesirably large power, cost, and device size parameters in order to provide comparable error detection resolution. Various embodiments of the present disclosure may include all, some, or none of these particular advantages.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. An apparatus, comprising:
a deserializer unit configured to receive input data on a plurality of input serial data lines, wherein the deserializer unit is configured to transmit the input data corresponding to a given one of the plurality of input serial data lines in parallel on a corresponding one of a plurality of output data lanes that include a first number of individual output data lines;
a selection circuit configured to select one of the plurality of output data lanes for error checking in sequence;
a plurality of expected-pattern generators corresponding to the first number of individual output data lines, the plurality of expected-pattern generators being configured to provide expected data patterns;
an error checking unit including a plurality of 1-bit comparison units corresponding to the first number of individual output data lines, the error checking unit being configured to receive data corresponding to the selected one of the plurality of output data lanes and compare the received input data to the expected data pattern; and
an error accumulator configured to track single-bit errors detected by the error checking unit and record which of the individual output data lines is associated with the single-bit errors.

2. The apparatus of claim 1, wherein the input serial data lines are differential serial data lines.

3. The apparatus of claim 1, wherein the the selection circuit includes a register configured to store a value specifying one of the plurality of output data lanes for error checking.

4. A method, comprising:
reading a storage location to determine a value indicative of a selected one of a plurality of parallel data lanes to check for data errors, wherein the plurality of parallel data lanes each includes a selected number of individual data lines;
responsive to the determined value, routing output from the selected data lane to an error checking circuit;
a plurality of expected-pattern generators corresponding to the selected number of individual data lines providing expected data patterns;
the error checking circuit including a plurality of 1-bit comparison units comparing the routed output to the expected data patterns to determine wether any errors are present;
for each of the plurality of parallel data lanes, repeating the steps of: reading the storage location, routing the output, providing the expected data pattern, and comparing the routed output to the expected data pattern; and
tracking single-bit errors detected by the error checking unit and recording which of the individual data lines is associated with each single-bit error via an error accumulator.

5. The method of claim 4, further comprising transmitting, from the error checking circuit, a result corresponding to a difference between the output and the expected data pattern.

6. The method of claim 4, wherein the error checking circuit is a component of a memory buffer device.

7. A system, comprising:
a first device configured to transmit a first set of data via a first plurality of transmission lines; and
a second device configured to receive a second set of data corresponding to the first set of data via a second plurality of transmission lines;
wherein the second device includes a transmission line selector configured to select a particular subset including a first number of the second plurality of transmission lines for error detection;
wherein the second device further includes a plurality of expected-pattern generators that correspond to the first number that are configured to provide known data, and an error detection circuit a plurality of 1-bit comparison units that correspond to the first number that hare configured to compare the second set of data received via the particular subset of the second plurality of transmission lines to the known data corresponding to the first set of data;
wherein the transmission line selector is further configured to select, in sequence, a plurality of subsets of the second plurality of transmission lines, the plurality of subset including all of the second plurality of transmission lines; and
wherein the transmission line selector is further configured to select, in sequence, a plurality of subsets of the second plurality of transmission lines, the plurality of subsets including all of the second plurality of transmission lines; and
wherein the second device further includes an error accumulator configured to track single-bit errors detected by the error detection circuit and record which of the second plurality of transmission lines in the particular subset is associated with the single-bit errors.

8. The system of claim 7, wherein the second device is further configured to detect burst errors in the second set of data.

9. The system of claim 7, wherein the first plurality of transmission lines and the second plurality of transmission lines are the same.

10. The system of claim 7, wherein the second plurality of transmission lines is distinct from the first plurality of transmission lines.

11. The system of claim 10, further comprising a deserializer, wherein:
the first plurality of transmission lines are serial transmission lines coupled to an input of the deserializer; and
the second plurality of transmission lines are parallel transmission lines coupled to an output of the deserializer.

12. The system of claim 7, wherein the first device and the second device are symmetric.

* * * * *

UNITED STATES PATENT AND TRADEMARK OFFICE
CERTIFICATE OF CORRECTION

PATENT NO. : 9,170,869 B2  
APPLICATION NO. : 13/671311  
DATED : October 27, 2015  
INVENTOR(S) : Rotker et al.

Page 1 of 1

It is certified that error appears in the above-identified patent and that said Letters Patent is hereby corrected as shown below:

In the Claims

In column 7, line 12, in claim 1, delete "include" and insert -- includes --, therefor.

In column 7, line 14, in claim 1, delete "select one" and insert -- select each --, therefor.

In column 7, line 32, in claim 3, delete "the the" and insert -- the --, therefor.

In column 7, line 48, in claim 4, delete "wether" and insert -- whether --, therefor.

In column 8, line 16, in claim 7, delete "correspond" and insert -- corresponds --, therefor.

In column 8, line 18, in claim 7, after "circuit" insert -- including --.

In column 8, line 19, in claim 7, delete "correspond" and insert -- corresponds --, therefor.

In column 8, line 19, in claim 7, delete "hare" and insert -- are --, therefor.

In column 8, lines 24-28, in claim 7, delete "wherein the transmission line selector is further configured to select, in sequence, a plurality of subsets of the second plurality of transmission lines, the plurality of subset including all of the second plurality of transmission lines; and".

Signed and Sealed this
Twenty-eighth Day of June, 2016

Michelle K. Lee
*Director of the United States Patent and Trademark Office*